(12) United States Patent
Kwon et al.

(10) Patent No.: US 10,091,688 B2
(45) Date of Patent: Oct. 2, 2018

(54) SYSTEMS AND METHODS FOR PACKET RELAYING

(71) Applicant: FutureWei Technologies, Inc., Plano, TX (US)

(72) Inventors: Younghoon Kwon, San Diego, CA (US); Yunsong Yang, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 569 days.

(21) Appl. No.: 14/073,028

(22) Filed: Nov. 6, 2013

(65) Prior Publication Data

US 2014/0160930 A1 Jun. 12, 2014

Related U.S. Application Data (60) Provisional application No. 61/734,818, filed on Dec. 7, 2012.

(51) Int. Cl.
*H04L 1/00* (2006.01)
*H04L 12/26* (2006.01)
(Continued)

(52) U.S. Cl.
CPC ......... *H04W 28/0289* (2013.01); *H04L 1/188* (2013.01); *H04W 16/26* (2013.01); *H04L 2001/0097* (2013.01); *H04W 84/047* (2013.01)

(58) Field of Classification Search
CPC ... H04B 7/15528; H04B 7/15557; H04B 7/14
See application file for complete search history.

(56) References Cited

U.S. PATENT DOCUMENTS 7,103,371 B1 9/2006 Liu
2005/0226201 A1* 10/2005 McMillin ............... H04L 45/00
370/348

(Continued)

FOREIGN PATENT DOCUMENTS

CN 1555637 A 12/2004
CN 101102174 A 1/2008
(Continued)

OTHER PUBLICATIONS

International Search Report and Written Opinion of the International Searching Authority received in Patent Cooperation Treaty Application No. PCT/CN2013/088127, mailed Mar. 6, 2014, 10 pages.

(Continued)

*Primary Examiner* — Yemane Mesfin
*Assistant Examiner* — Abdelillah Elmejjarmi
(74) *Attorney, Agent, or Firm* — Jinghua Karen Tang (57) ABSTRACT

System and method embodiments are provided for packet relaying. The embodiments enable reduced network traffic. In an embodiment, a method in a wireless network component for packet relaying includes transmitting a first data packet comprising data to a relay station, wherein the first data packet comprises an identification (ID) of the target wireless device wherein the data packet is intended for a target wireless device, wherein the relay station is configured to forward the data in the first data packet to the target wireless device without sending an acknowledgement back to the wireless network component; receiving a second data packet transmitted by the relay station; and determining whether a receiver ID of the second data packet corresponds to the target wireless device, wherein the wireless network component considers the transmission successful if the (Continued)

receiver ID of the second data packet corresponds to the target wireless device.

20 Claims, 4 Drawing Sheets (51) Int. Cl.
H04W 28/02 (2009.01)
H04W 16/26 (2009.01)
H04L 1/18 (2006.01)
H04W 84/04 (2009.01)

(56) References Cited

U.S. PATENT DOCUMENTS

| | | | |
|---|---|---|---|
| 2007/0161388 A1 | 7/2007 | Ji | |
| 2007/0230433 A1* | 10/2007 | Okamasu | H04L 1/1657 370/347 |
| 2008/0267127 A1 | 10/2008 | Narasimha et al. | |
| 2012/0207078 A1* | 8/2012 | Hwang | H04W 80/02 370/315 |

FOREIGN PATENT DOCUMENTS

| | | |
|---|---|---|
| CN | 101755395 A | 6/2010 |
| CN | 101835194 A | 9/2010 |
| EP | 1816791 A1 | 8/2007 |
| JP | 2003-508939 A | 3/2003 |
| JP | 2008-17487 A | 1/2008 |
| JP | 2009-5299 A | 1/2009 |
| WO | 00/74306 A2 | 12/2000 |
| WO | 2006/057044 A1 | 1/2006 |

OTHER PUBLICATIONS

Supplementary European Search Report for EP 13861038, dated Nov. 25, 2015, 2 pages.
Cheong, M., "TGah Functional Requirements and Evaluation Methodology Rev. 45," IEEE 802.11-09/00000905r45, Jan. 2012, 24 pages.
Park, M., "Proposed Specification Framework for TGah," IEEE 802.11-11/1137r12, Nov. 2012, 50 pages.
Park, M., "Proposed Specification Framework for TGah," IEEE 802.11-11/1137r13, Jan. 2013, 58 pages.
Wong, E. et al., "Two-Hop Relay Function," IEEE802.11-12/1330r0, Nov. 2012, 27 pages.
Young Hoon Kwon et al., "Implicit ACK for Relay," IEEE802.11-13/0075r0, Huawei Technologies Co., Ltd., Jan. 14, 2013. 11 pages.
IEEE 802.11-11/1137r6 Minyoung Park,"Proposed Specification Framework for Tgah," IEEE P802.11 Wireless LANs, dated Mar. 12, 2012, total 13 pages.
IEEE 802.11-11/1137r12 Minyoung Park,"Proposed Specification Framework for TGah", IEEE P802.11 Wireless LANs, dated Nov. 15, 2012, total 51 pages.
IEEE P802.11ah/D1.0,"3. Definitions, acronyms, and abbreviations", dated Oct. 2013, total 394 pages.

* cited by examiner

SYSTEMS AND METHODS FOR PACKET RELAYING

CROSS-REFERENCE TO RELATED APPLICATIONS

The present application claims the benefit of U.S. Provisional Patent Application No. 61/734,818 filed Dec. 7, 2012 and entitled "System and Method for Packet Relaying," which is incorporated herein by reference as if reproduced in its entirety.

TECHNICAL FIELD

The present invention relates to a system and method for wireless communications, and, in particular embodiments, to a system and method for packet relaying.

BACKGROUND

A relay station is considered for most advanced wireless communication systems, such as Institute of Electrical and Electronics Engineers (IEEE) 802.11, IEEE 802.16 and 3GPP LTE. Specifically in IEEE 802.11, task group ah (TGah) recently decided to include a relay feature with it. However, as a relay means multiple transmissions of the same packet, it is desired to minimize any associated overhead. There have been several ideas proposed in IEEE 802.11 TGah for efficient transmission in a relay configuration.

Figure 1:
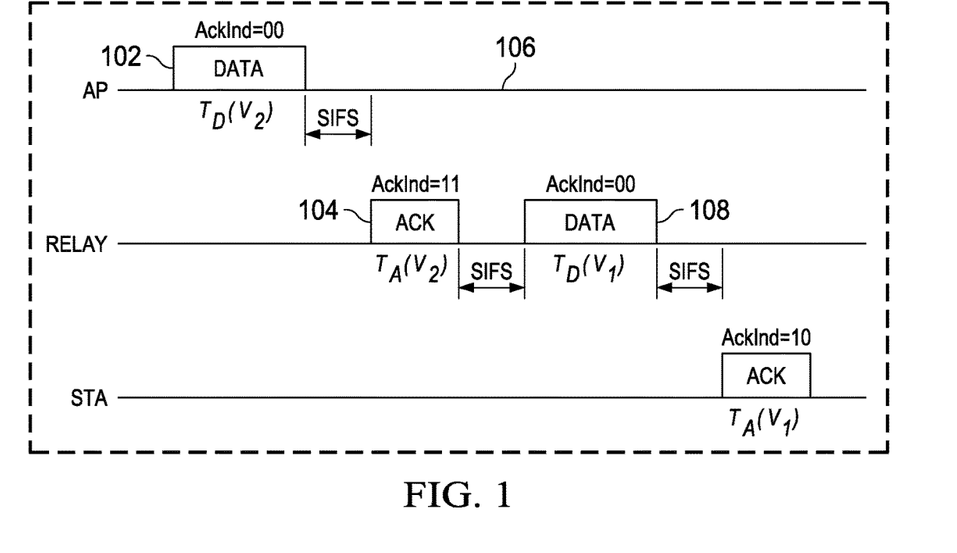
FIG. 1 illustrates a downlink relay example.

One example is a shared transmission opportunity (TXOP) for the relay to reduce the number of contentions for channel access. FIG. 1 illustrates a downlink relay example. In 102, the access point (AP) sends a downlink DATA frame to the relay. In 104, the relay sends an acknowledgment (ACK). In 106, after receipt of ACK, the AP removes a frame from the buffer, and defers maximum physical protocol data unit (MAX_PPDU)+ACK+2*SIFS before the next event. In 108, in short inter-frame space (SIFS) time, the relay sends DATA with a modulation an coding scheme (MCS) that does not need to be the same (although it may be the same) as the MCS that the AP sent to the relay, depending on the channel condition between the relay and the STA. The relay buffers the frame until successful delivery or reaching of a retry limit.

Figure 2:
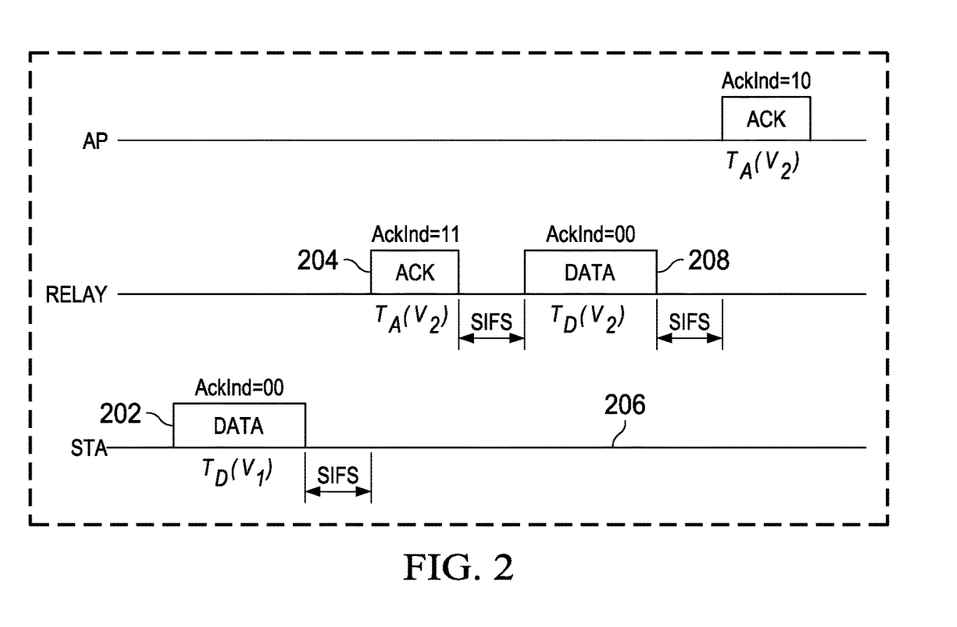
FIG. 2 illustrates an uplink relay example.

FIG. 2 illustrates an uplink relay example. In 202, a station (STA) (i.e., a wireless station) sends an uplink DATA frame to the relay. In 204, the relay sends ACK. In 206, after receipt of ACK, the STA removes a frame from the buffer, and defers MAX_PPDU+ACK+2*SIFS before the next event. In 208, in SIFS time, the relay sends DATA with a MCS that may be the same or different from the MCS that the AP sent to the relay. The relay buffers the frame until successful delivery or reaching of a retry limit.

For both the downlink and uplink examples, however, the ACK frame has to be sent from the relay station to the original sender to make sure the data packet is successfully received at the relay station.

SUMMARY

In accordance with an embodiment, a method in a wireless network component for packet relaying includes transmitting with the wireless network component a first data packet comprising data to a relay station, wherein the first data packet comprises an identification (ID) of the target wireless device wherein the data packet is intended for a target wireless device, wherein the relay station is configured to forward the data in the first data packet to the target wireless device without sending an acknowledgement back to the wireless network component; receiving a second data packet transmitted by the relay station; and determining whether a receiver ID of the second data packet corresponds to the target wireless device, wherein the wireless network component considers a transmission of the data to the target wireless device successful if the receiver ID of the second data packet corresponds to the target wireless device.

In accordance with an embodiment, a wireless network component configured for packet relaying includes a processor and a computer readable storage medium storing programming for execution by the processor, the programming including instructions to: transmit a first data packet comprising data to a relay station, wherein the first data packet comprises an identification (ID) of the target wireless device wherein the data packet is intended for a target wireless device, wherein the relay station is configured to forward the data in the first data packet to the target wireless device without sending an acknowledgement back to the wireless network component; receive a second data packet broadcast by the relay station; and determine whether a receiver ID of the second data packet corresponds to the target wireless device, wherein the wireless network component considers a transmission of the data to the target wireless device successful if the receiver ID of the second data packet corresponds to the target wireless device.

In accordance with an embodiment, a method in a relay station for packet relay in includes receiving with the relay station a first data packet from a first wireless station, wherein the first data packet comprises data destined for a second wireless station, wherein the first data packet comprises an identification (ID) of the second wireless device; and transmitting a second data packet to the second wireless station, wherein the second data packet comprises the data and at least a portion of the ID, wherein the relay station is configured to forward the data to the second wireless station without sending an acknowledgement back to the first wireless station.

In accordance with an embodiment, a relay station configured for packet relaying includes a processor and a computer readable storage medium storing programming for execution by the processor, the programming including instructions to: receive a first data packet from a first wireless station, wherein the first data packet comprises data destined for a second wireless station, wherein the first data packet comprises an identification (ID) of the second wireless device; and transmit a second data packet to the second wireless station, wherein the second data packet comprises the data and at least a portion of the ID, wherein the relay station is configured to forward the data to the second wireless station without sending an acknowledgement back to the first wireless station.

In accordance with an embodiment, a method in a first station to wirelessly forward data from a first station to a second station via a relay station includes transmitting with the first station a message protocol data unit (MPDU) associated with the relay station to the relay station, wherein the relay station is configured to forward the received MPDU to the second station that the relay station is associated with within a short inter-frame space (SIFS) time; and determining a successful acknowledgement when a valid Physical Layer Conversion Protocol (PLCP) header is received within an ACKTimeout interval and whether a partial association identifier (PAID) in the received PLCP header corresponding to a receiver address (RA) is identical to a PAID corresponding to a Basic Service Set Identifier (BSSID) of the second station or a RA of the second station, thereby permitting a frame sequence to continue or to end without retries.

In accordance with an embodiment, a first station configured to wirelessly forward data from a first station to a second station via a relay station configured for packet relaying includes a processor and a computer readable storage medium storing programming for execution by the processor, the programming including instructions to: transmit a message protocol data unit (MPDU) associated with the relay station to the relay station, wherein the relay station is configured to forward the received MPDU to the second station that the relay station is associated with within a short inter-frame space (SIFS) time; and determine a successful acknowledgement when a valid Physical Layer Conversion Protocol (PLCP) header is received within an ACKTimeout interval and whether a partial association identifier (PAID) in the received PLCP header corresponding to a RA is identical to a PAID corresponding to a Basic Service Set Identifier (BSSID) of the second station or a RA of the second station, thereby permitting a frame sequence to continue or to end without retries.

In an embodiment, a method in a relay station for implicit acknowledgement of data reception under a transmission opportunity (TXOP) sharing relay operation includes receiving at the relay station a message protocol data unit (MPDU) transmitted by a station (STA) associated with the relay station under TXOP sharing relay operation; and accepting at the STA the reception as a successful acknowledgement of the MPDU transmission when a PARTIAL_AID in the PHY-RXSTART.indication primitive that occurs within a PHY-RX-START-delay is identical to a PARTIAL_AID corresponding to a Basic Service Set Identifier (BSSID) of a root AP.

In an embodiment, a method in a relay station for implicit acknowledgement of data reception under a transmission opportunity (TXOP) sharing relay operation includes receiving at the relay station a message protocol data unit (MPDU) transmitted by a root AP under TXOP sharing relay operation; and accepting the reception at the root AP as a successful acknowledgement of the MPDU transmission when a PARTIAL_AID in a PHY-RXSTART.indication primitive that occurs within a PHY-RX-START-delay is identical to a PARTIAL_AID corresponding to a destination address (DA) of the transmitted MPDU.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems and methods for packet relaying. In an embodiment, a relay station receives a data packet from a wireless device (e.g., an AP or a STA or other wirelessly enabled network components) and forwards the data packet to a destination device (e.g., an AP or a STA or other wirelessly enabled network components). The relay station uses at least a partial unique identifier or unique address of the intended destination device in a packet header (or physical header portion) of the data packet and does not send an acknowledgement back to the sender. The sender may be the AP or may be a STA (e.g., a wireless device). In an embodiment, the unique identifier or unique address is unique in the relay station's network, but may not be unique in the sender's network. In an embodiment, the relay may inform the sender (STA or AP) the unique identifier or unique address of the intended destination device. The sender monitors the wireless channel for signals sent from the relay station to the target or intended destination wireless device. If the sender determines that a packet sent by the relay station contains at least a partial identifier corresponding to the intended destination, the sender determines that the data packet has been forwarded successfully.

In an embodiment, the relay station transmits the identification of the target station, for example a partial associated identifier of STA or unique address of the target station to the AP prior to the AP sending a data packet to the target station. In an embodiment, the relay station transmits the identification and/or unique address of the target station to the AP when the target station associates with the relay station. In an embodiment, the relay station provides an updated identification of the target station when the identification of the target station changes.

In an embodiment, the relay station transmits the identification of the AP, for example a partial associated identifier of AP, or unique address of the AP that the relay station is associated with to a station when the station associates with the relay station. The station uses the identification (ID) or unique address to send data packets to the AP via the relay station. In an embodiment, this ID or unique address is used for acknowledging its transmission to the relay when the STA sends data packets to the AP via the relay station. In an embodiment, the target station may be a non-AP station (i.e., a target non-AP station).

An embodiment relay station relays a data packet without sending an ACK frame to the sender. (The sender may also be referred to as an initiator which may be an AP or a STA or other wirelessly enabled network components.) In an embodiment, there is no ambiguity when no acknowledgment (ACK) frame is sent to the initiator. An embodiment eliminates ACK frame transmission in relaying a packet from the relay to the source, without ambiguity. In an embodiment, there still exists an ACK from the receiver to the relay. An embodiment reduces whole packet transmission time in relaying a packet from a source to a destination, thus providing better wireless medium usage. Embodiments may be implemented in devices with Wi-Fi capabilities, such as access points, relays, smart phones, tablets, wireless sensors, and the like.

In an embodiment, a relay station relays a first data packet from a first wireless station to a second wireless station. The relay station receives the first data packet from the first wireless station wherein the first data packet includes an identification (ID) of the second wireless station. The relay station then transmits the data in the first data packet using a second data packet to the second wireless station without sending an acknowledgment back to the first wireless station, wherein the second data packet includes at least a portion of the ID of the second wireless station. In an embodiment, the relay station uses a STA information announcement frame including an AID announcement element to transmit the AID or the PAID to the first wireless station. In an embodiment, the second wireless station's ID includes a Basic Service Set Identifier (BSSID) of the second wireless station when the second wireless station is an AP. In an embodiment, the relay station uses a RootAP BSSID field in a relay element in a beacon frame or a probe response frame to transmit the AID or PAID to the first wireless station.

In an embodiment downlink transmission, an AP sends a data packet to a relay station, where the relay station will relay the packet to a target STA (also referred to as a target wireless device). An association identifier or association identification (AID) for STAs associated with a relay station is known to the AP that the relay station with which the relay station is associated. After an AP transmits a data packet to a relay station, the relay station directly forwards the packet to the target STA after a predetermined delay without sending the AP back an ACK frame, with at least an identifier corresponding to the STA's AID indicated at the physical (PHY) header part of the relaying packet. After sending a data packet to a relay station, the AP checks the PHY header part of the subsequent packet to determine if the receiver identification or identifier (ID) of the subsequent packet is the target STA. If the receiver ID of the subsequent packet is the target STA, the AP considers that its transmission to the relay station was successfully delivered.

In an embodiment uplink transmission, a STA sends a data packet to a relay station, where the relay station will relay the packet to a target AP. STAs associated with a relay station know the ID of the target AP. After the STA transmits the data packet to the relay station, the relay station directly forwards the packet to the target AP after a predetermined delay without sending the STA back an ACK frame, with at least an identifier corresponding to the target AP's ID, for example a partial associated ID of the AP, indicated at the PHY header part of the relaying packet. After sending the data packet to the relay station, the STA checks the PHY header part of the subsequent packet to determine if the receiver ID of the subsequent packet is the target AP. If the receiver ID of the subsequent packet is the target AP, the STA considers that its transmission to the relay station was successfully delivered.

In an embodiment, an implicit ACK procedure is disclosed. When a relay station receives a medium access control (MAC) protocol data unit (MPDU) for forwarding in TXOP sharing relay operation, the relay station may directly forward the received MPDU without sending back acknowledgement frame to the transmitter of the MPDU. In an embodiment, this implicit ACK mechanism is available when Partial AID (PAID) information is included in the Physical Layer Conversion Protocol (PLCP) header (≥2 MHz PHY frame format).

In an embodiment, if an MPDU is transmitted by a STA associated with a relay station to the relay station, the relay station forwards the received MPDU to the AP that it is associated with in SIFS time. After transmitting the MPDU, the STA shall wait for an ACKTimeout interval, for example, with a value of aSIFSTime+aSlotTime+aPHY-RXSTART-Delay, starting at the PHY-TXEND.confirm primitive. If the STA receives a valid PLCP header within the ACKTimeout interval and PAID in the received PLCP header is matched, for example identical to PAID corresponding to Basic Service Set Identifier (BSSID) of the AP, the STA recognize it as successful acknowledgement, permitting the frame sequence to continue, or to end without retries, as appropriate for the particular frame sequence in progress.

In an embodiment, if an MPDU is transmitted by a AP to a relay station, the relay station forward the received MPDU to the STA that is associated with in SIFS time. After transmitting the MPDU, the AP shall wait for an ACKTimeout interval, with a value of aSIFSTime+aSlotTime+aPHY-RX-START-Delay, starting at the PHY-TXEND.confirm primitive. If the AP receives a valid PLCP header within the ACKTimeout interval and PAID in the received PLCP header is matched, for example identical to PAID corresponding to DA of the transmitted MPDU, the AP recognizes it as successful acknowledgement, permitting the frame sequence to continue, or to end without retries, as appropriate for the particular frame sequence in progress. If the receiver address (RA) of the forwarded MPDU is different from the destination address (DA) of MPDU transmitted by the AP, the relay station shall use explicit ACK procedure.

In an embodiment, for a downlink implicit ACK procedure, an AP that the relay is associated with shall know the identification of the STAs, for example the AID of the STAs or the PAID of STAs associated with a relay station that is associated with the AP. For implicit ACK, a relay station may indicate an associated STA's identification, for example, the AID or PAID of the STA to the AP by sending an STA Information Announcement frame including an AID Announcement element when the STA becomes associated or the STA's AID is changed.

In an embodiment, for an uplink implicit ACK procedure, STAs associated with a relay station shall know the identification of AP, for example the PAID of the AP or the BSSID of the AP that serving relay station is associated with. For this purpose of implicit ACK, a relay station may indicate the PAID of the AP or the BSSID of the AP to newly associated STAs by using RootAP BSSID information in Beacon frame or Probe Response frame.

In an embodiment, under TXOP sharing relay operation, if an MPDU is transmitted by a STA associated with a relay AP under TXOP sharing relay operation, and the PARTIAL_AID in the PHY-RXSTART.indication primitive that occurs within a PHY-RX-START-delay is matched, for example identical to the PARTIAL_AID corresponding to the BSSID of the root AP, then the reception shall be accepted as a successful acknowledgement of the MPDU transmission. Another exception is when an AP transmits an MPDU to a Relay STA under TXOP sharing relay operation and the PARTIAL_AID in the PHY-RXSTART.indication primitive that occurs within a PHY-RX-START-delay is matched, for example identical to the PARTIAL_AID corresponding to the DA of the transmitted MPDU shall be accepted as a successful acknowledgement of the MPDU transmission.

Figure 3:
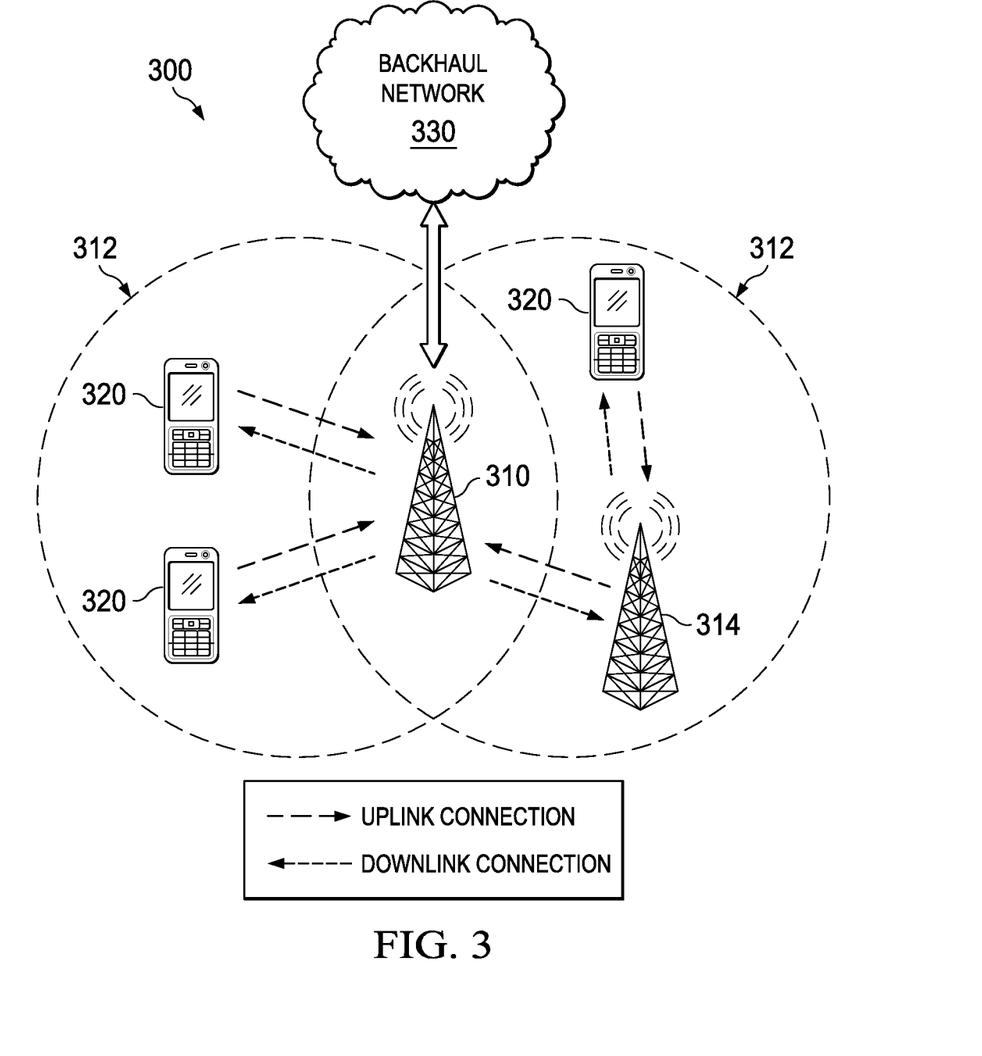
FIG. 3 illustrates a network for communicating data.

FIG. 3 illustrates a network 300 for communicating data. The network 300 comprises an AP 310 and a relay station 314 each having a coverage area 312, a plurality of STAs 320, and a backhaul network 330. As used herein, the term AP may also be referred to as a transmission point (TP) or a base station (BS) and the three terms may be used interchangeably throughout this disclosure. The AP 310 and the relay station 314 each may comprise any component capable of providing wireless access by, inter alia, establishing uplink (UL) (dashed line) and/or downlink (DL) (dotted line) connections with the STAs 320, such as a base transceiver station (BTS), an enhanced base station (eNB), a femtocell, and other wirelessly enabled devices. The STAs 320 may comprise any component capable of establishing a wireless connection with the AP 310. The STAs 320 may also be referred to as user equipment (UEs). Examples of STAs include smart phones, tablet computers, and laptops. The AP 310 may also be referred to as a STA. The backhaul network 330 may be any component or collection of components that allow data to be exchanged between the AP 310 and a remote end (not shown). In some embodiments, the network 300 may comprise various other wireless devices, such as relays, femtocells, etc. Some of the STAs 320 communicate with the AP 310 via the relay station 314. One reason that a STA 320 may communicate with the relay station 314 is that the STA 320 may be outside of the coverage area 312 of the AP.

In an embodiment, the relay station 314 is configured not to send an explicit acknowledgement to the STA 320 or the AP 310 when relaying data from a STA 320 to the AP 310 or from the AP 310 to a STA 320. The AP 310 (or the STA 320) is configured to monitor a wireless channel for transmissions from the relay station 312 and if an address, partial address, or identifier (for example a partial associated identifier of the AP or the STA) in a packet header of a transmission from the relay station 312 to a target device, for example the AP 310 or the STA 320 is matched to the address, partial address, or identifier of the target device, then the AP 310 (or STA 320) considers the transmission to be successful.

Figure 4:
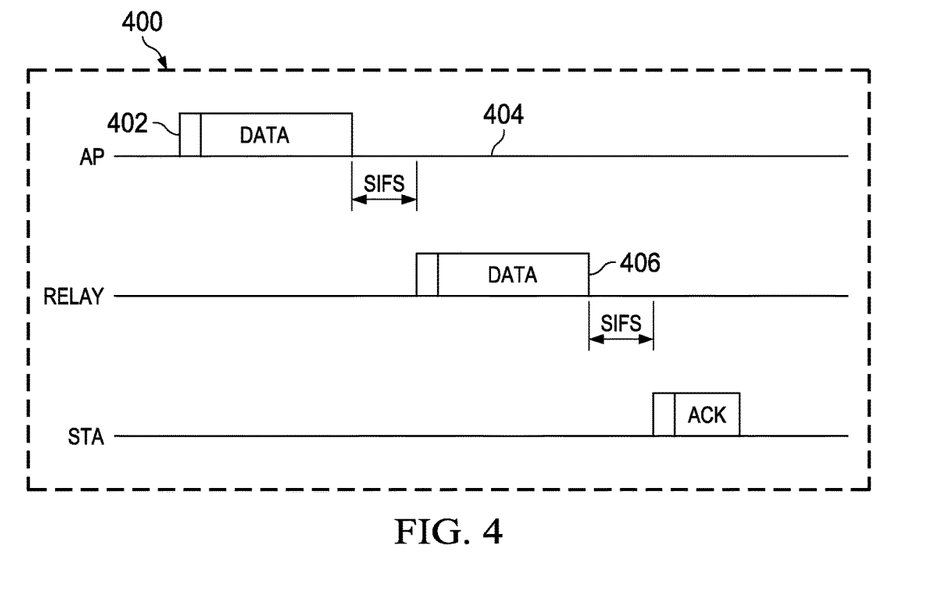
FIG. 4 illustrates an embodiment downlink procedure.

FIG. 4 illustrates an embodiment downlink procedure 400. In 402, the AP sends a downlink DATA frame with receiver ID set to that of the relay station in the PHY header. In 406, in SIFS time, the relay station retransmits the downlink DATA frame (with possibly different) MCS to a target STA to which the downlink DATA frame is intended with the receiver ID set to that of the target STA. In the retransmission, the relay station includes the receiver ID in the PHY header field. The AP monitors transmissions from the relay station and, in 404, if within SIFS time the AP receives a PHY header field of the retransmission, the AP checks if the receiver ID of the retransmission is that of the target STA. If it is, then the AP considers the transmission of the downlink DATA frame to the target STA to be successful and does not attempt to retransmit the downlink DATA frame. If a transmission from the relay station within a specified time period (e.g., SIFS time plus a time duration of the DATA frame) is not received that includes the receiver ID of the target STA in the PHY header field, then the AP may consider the transmission of the downlink DATA frame to be unsuccessful and may attempt to retransmit the downlink DATA frame. After the target STA receives the retransmission from the relay station, in SIFS time, the target STA transmits an acknowledgement back to the relay station. In an embodiment, the relay station does not transmit an acknowledgement back to the AP.

Figure 5:
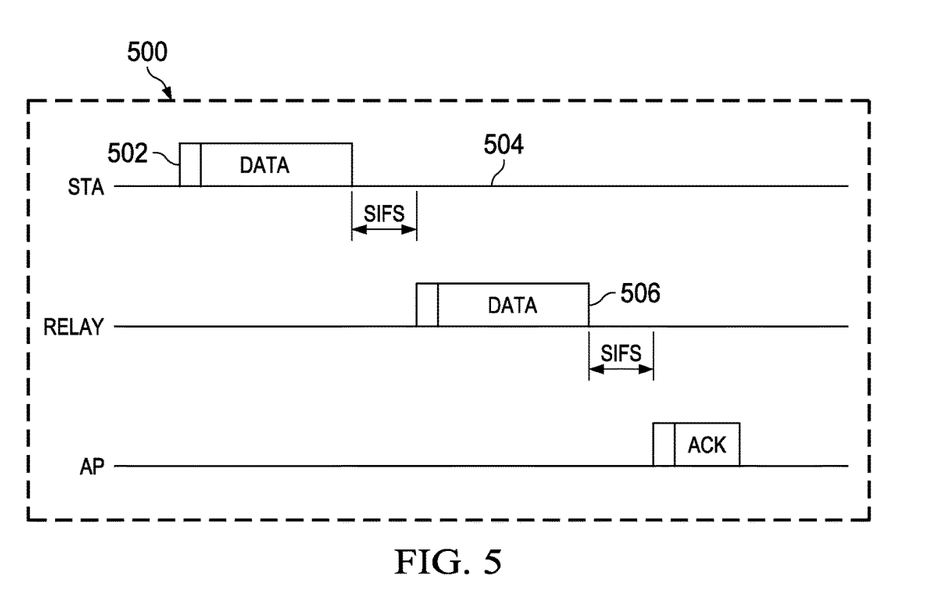
FIG. 5 illustrates an embodiment uplink procedure.

FIG. 5 illustrates an embodiment uplink procedure 500. In 502, the STA sends an uplink DATA frame with receiver ID set to that of the relay station in the PHY header. In 506, in SIFS time, the relay station retransmits the uplink DATA frame (with possibly different MCS) with the receiver ID in the PHY header field set to that of the target AP. The STA monitors transmissions from the relay station and, in 504, if within SIFS time, the STA receives a transmission from the relay station, the STA checks the PHY header field and checks if the receiver ID is that of the target AP. If the receiver ID in the PHY header field of the transmission from the relay station is that of the target AP, the STA considers that the uplinkd DATA frame transmission is successful and does not attempt to retransmit the uplink DATA frame. If a transmission from the relay station within a specified time period (e.g., SIFS time plus a time duration of the DATA frame) is not received that includes the receiver ID of the target AP in the PHY header field, then the STA may consider the transmission of the uplink DATA frame to be unsuccessful and may attempt to retransmit the uplink DATA frame. After the target AP receives the retransmission from the relay station, in SIFS time, the target AP transmits an acknowledgement back to the relay station. In an embodiment, the relay station does not transmit an acknowledgement back to the STA since the STA's receipt of the retransmission and confirmation that the retransmission contains the receiver ID of the target AP is considered to be the acknowledgment that the uplink DATA frame transmission was successful.

In downlink transmission, for each data packet at the PHY header part of the packet, there is a field corresponding to the receiver's ID (e.g., partial AID or a function of AP's ID), such that any station that receives the PHY header part of the packet can identify whether the receiver of the packet is this station or not without decoding the whole payload part of the packet.

Before data packet transmission, when a STA joins a network under a relay station's coverage, the relay station reports the joined STA's information to its root AP. Information of the joined STA may include the assigned Association ID (AID) or the partial AID of the STA under the relay station, as well as the STA's unique ID (e.g., media access control (MAC) Address in the medium access layer). The AP identifies that a STA with the given unique ID belongs to the relay station and maintains a mapping relation of the STA's AID or PAID under the relay station to the STA's unique ID. For AP's packet transmission to a relay station, when there is a data packet that an AP needs to deliver to a STA which is under a relay station's coverage, the AP sends the data packet to the relay station.

For the relay station's packet transmission to a target STA, when a relay station receives a packet from an AP, it determines the final destination of the packet and re-encodes the packet accordingly. The re-encoded packet may have a different modulation and coding scheme (MCS) from the one it received depending on the channel condition between the relay station and the target STA. The PHY header part of the re-encoded packet includes a field corresponding to the target STA's ID (e.g., target wireless device's ID). After receiving the packet from the AP, the relay station transmits the re-encoded packet after predetermined delay (e.g., SIFS) to the target STA.

With respect to the AP, after sending a downlink packet to a relay station, the AP keeps monitoring the wireless channel to check if any PHY header part of a packet is detected after the predetermined delay (i.e., predetermined time). If a PHY header part of a packet is detected at the aforementioned time, the AP checks if the field corresponding to the receiver's ID is that of the target STA. In case that field information is for the target STA, the AP considers that its previous transmission was successfully received at the relay station. If either the AP did not receive any PHY header part of a packet or it does not include the target STA's ID in the received PHY header in given time, the AP considers that its previous transmission was not successfully received at the relay station, and initiates a retransmission process.

In uplink transmission, for each data packet, at the PHY header part of the packet, there is a field corresponding to the receiver's ID (e.g., partial AID or a function of AP's ID), such that any station that receives the PHY header part of the packet can identify whether the receiver of the packet is this station or not without decoding the whole payload part of the packet. Before data packet transmission, when a STA joins a network under a relay station's coverage, the relay station indicates to the STA that the STA belongs to a relay station and the ID of the root AP. For the STA's packet transmission to a relay station, when there is a data packet that an STA under a relay stations' coverage needs to deliver to an AP, the STA sends the data packet to the relay station.

Alternatively, instead of using the receiver's ID field of the PHY header part of the received packet, packet length information can be used to check if the received packet is the relay transmission of its own transmission. If the packet length of the received packet is same as the one that the transmitter originally transmitted, the transmitter considers that its own packet was successfully delivered to the relay station. This method can be used for both downlink and uplink.

For the relay station's packet transmission to the target AP, when the relay station receives a packet from a STA, it figures out the final destination of the packet and re-encodes the packet accordingly. The re-encoded packet may have a different modulation and coding scheme (MCS) from the one it received depending on the channel condition between the relay station and the target AP. The PHY header part of the re-encoded packet includes a field corresponding to the target AP's ID. After receiving the packet from the STA, the relay station transmits the re-encoded packet after a predetermined delay (e.g., SIFS) to the target AP.

With respect to the STA, after sending an uplink packet to the relay station, the STA keeps monitoring the channel to determine if any PHY header part of a packet is detected after the predetermined delay. If a PHY header part of a packet is detected at the aforementioned time, the STA checks if the field corresponding to the receiver's ID is that of the target AP. In case that field information is for target AP, the STA considers that its previous transmission was successfully received at the relay station. If either the STA did not receive any PHY header part of a packet or it does not include the target AP's ID in received PHY header in given time, the STA considers that its previous transmission was not successfully received at the relay station, and initiates a retransmission process.

Figure 6:
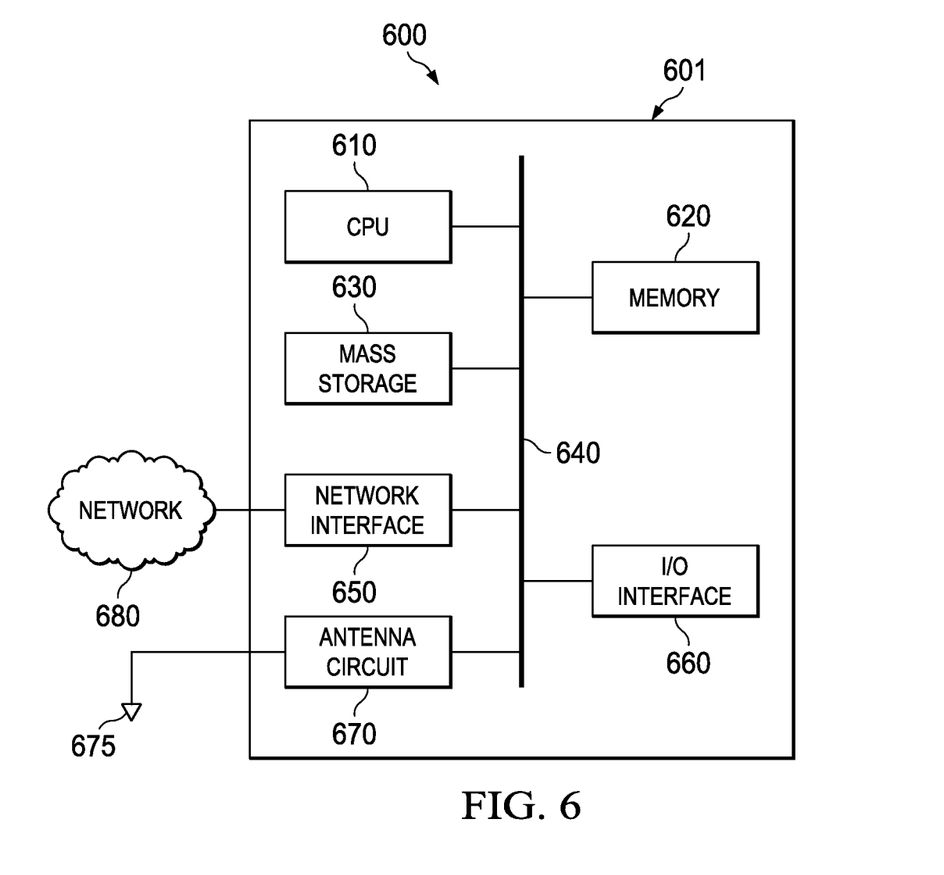
FIG. 6 illustrates a computing platform that may be used for implementing, for example, the devices and methods described herein, in accordance with an embodiment.

IEEE802.11-11/1137r12, Proposed specification framework for TGah, November 2012 and IEEE802.11-12/1330r0, Two-hop relay function, November 2012 are related to subject matter of the present application. Each of these references is incorporated herein by reference in its entirety:

FIG. 6 is a block diagram of a processing system 600 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a speaker, microphone, mouse, touchscreen, keypad, keyboard, printer, display, and the like. The processing unit 601 may include a central processing unit (CPU) 610, memory 620, a mass storage device 630, a network interface 650, an I/O interface 660, and an antenna circuit 670 connected to a bus 640. The processing unit 601 also includes an antenna element 675 connected to the antenna circuit.

The bus 640 may be one or more of any type of several bus architectures including a memory bus or memory controller, a peripheral bus, video bus, or the like. The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs.

The mass storage device 630 may comprise any type of storage device configured to store data, programs, and other information and to make the data, programs, and other information accessible via the bus 640. The mass storage device 630 may comprise, for example, one or more of a solid state drive, hard disk drive, a magnetic disk drive, an optical disk drive, or the like.

The I/O interface 660 may provide interfaces to couple external input and output devices to the processing unit 601. The I/O interface 660 may include a video adapter. Examples of input and output devices may include a display coupled to the video adapter and a mouse/keyboard/printer coupled to the I/O interface. Other devices may be coupled to the processing unit 601 and additional or fewer interface cards may be utilized. For example, a serial interface such as Universal Serial Bus (USB) (not shown) may be used to provide an interface for a printer.

The antenna circuit 670 and antenna element 675 may allow the processing unit 601 to communicate with remote units via a network. In an embodiment, the antenna circuit 670 and antenna element 675 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 670 and antenna element 675 may also provide Bluetooth and/or WiFi connection to other devices.

The processing unit 601 may also include one or more network interfaces 650, which may comprise wired links, such as an Ethernet cable or the like, and/or wireless links to access nodes or different networks. The network interface 601 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a wireless network component for packet relaying, the method comprising:
transmitting, by the wireless network component, a first data packet to a relay station, wherein the first data packet comprising a first receiver identification (ID) of the relay station, data intended for a target wireless device, and an identification of the target wireless device;
receiving, by the wireless network component, a second data packet within a predetermined time after transmitting the first data packet, wherein the second data packet comprises a second receiver ID, and wherein the second receiver ID is derived from a function of the identification of the target wireless device;
determining, by the wireless network component, whether the second receiver ID in the second data packet corresponds to the identification of the target wireless device; and
determining, by the wireless network component, that the transmission of the first data packet to the relay station is successful when the second receiver ID in the second data packet corresponds to the identification of the target wireless device.

2. The method of claim 1, wherein the predetermined time comprises a Short Inter-Frame Space (SIFS).

3. The method of claim 1, further comprising receiving, by the wireless network component, the identification of the target wireless device from the relay station before transmitting the first data packet.

4. The method of claim 3, wherein the wireless network component is a root access point (AP) and the target wireless device is a station, and wherein the identification of the target wireless device is received together with an association ID (AID) of the target wireless device from the relay station when the target wireless device performs an association procedure with the relay station.

5. The method of claim 4, further comprising receiving, by the wireless network component, an updated AID of the target wireless device from the relay station when the AID of the target wireless device is changed.

6. The method of claim 3, wherein the wireless network component is a station and the target wireless device is a root access point (AP), and wherein the identification of the target wireless device is received from the relay station when the wireless network component performs an association procedure with the relay station.

7. The method of claim 6, wherein the identification of the target wireless device is a Basic Service Set Identifier (BSSID) of the root AP, and wherein the BSSID of the root AP is received in a beacon frame or a probe response frame from the relay station.

8. The method of claim 1, wherein the target wireless device is a root access point (AP), and wherein the determining whether the second receiver ID in the second data packet corresponds to the identification of the target wireless device comprises:
checking, by the wireless network component, whether the second receiver ID in the second data packet matches with an ID derived from the function of the identification of the target wireless device; and
determining, by the wireless network component, that the second receiver ID in the second data packet corresponds to the identification of the target wireless device when the second receiver ID in the second data packet is identical to the ID derived from the function of the identification of the target wireless device.

9. The method of claim 1, wherein the target wireless device is a station, and wherein the determining whether the second receiver ID in the second data packet corresponds to the identification of the target wireless device comprises:
checking, by the wireless network component, whether the second receiver ID in the second data packet matches with an ID derived from the function of an association ID (AID) of the target wireless device, wherein the AID of the target wireless device is associated with the identification of target wireless device; and
determining, by the wireless network component, that the second receiver ID in the second data packet corresponds to the identification of the target wireless device when the second receiver ID in the second data packet is identical to the ID derived from the function of the AID of the target wireless device.

10. The method of claim 8, wherein the identification of the target wireless device is a basic service set ID (BSSID) of the target wireless device, and wherein the ID derived from the function of the identification of the target wireless device is determined in accordance with the BSSID of the target wireless device.

11. The method of claim 1, wherein the second receiver ID is included in a physical (PHY) header of the second data packet.

12. A wireless network component configured for packet relaying, the wireless network component comprising:
a processor; and
a non-transitory computer readable storage medium storing programming for execution by the processor, the programming including instructions to:
transmit a first data packet to a relay station, wherein the first data packet comprising a first receiver identification (ID) of the relay station, data intended for a target wireless device, and an identification of the target wireless device;
receive a second data packet within a predetermined time after transmitting the first data packet, wherein the second data packet comprises a second receiver ID, and wherein the second receiver ID is derived from a function of the identification of the target wireless device;
determine whether the second receiver ID in the second data packet corresponds to the identification of the target wireless device; and
determine that the transmission of the first data packet to the relay station is successful when the second receiver ID in the second data packet corresponds to the identification of the target wireless device.

13. The wireless network component of claim 12, wherein the programming further includes instructions to receive the identification of the target wireless device from the relay station before transmitting the first data packet.

14. The wireless network component of claim 13, wherein the wireless network component is a root access point (AP) and the target wireless device is a station, and wherein the identification of the target wireless device is received together with an association ID (AID) of the target wireless device from the relay station when the target wireless device performs an association procedure with the relay station or when the AID of the target wireless device is changed.

15. The wireless network component of claim 13, wherein the wireless network component is a station, and the target wireless device is a root access point (AP), and wherein the identification of the target wireless device is received when the target wireless device performs an association procedure with the relay station.

16. The wireless network component of claim 15, wherein the identification of the target wireless device is a Basic Service Set Identifier (BSSID) of the root AP, and wherein the BSSID of the root AP is received in a beacon frame or a probe response frame from the relay station.

17. The wireless network component of claim 12, wherein the target wireless device is a root access point (AP), and wherein the instructions to determine whether the second receiver ID in the second data packet corresponds to the identification of the target wireless device comprises:
   instructions to check whether the second receiver ID included in the second data packet matches with an ID derived from the function of the identification of the target wireless device; and
   instructions to determine that the second receiver ID in the second data packet corresponds to the identification of the target wireless device when the second receiver ID in the second data packet is identical to the ID derived from the function of the identification of the target wireless device.

18. The wireless network component of claim 17, wherein the identification of the target wireless device is a basic service set ID (BSSID) of the target wireless device, and the ID derived from the function of the identification of the target wireless device is determined in accordance with the BSSID of the target wireless device.

19. The wireless network component of claim 12, wherein the target wireless device is a station, and wherein the instructions to determine whether the second receiver ID in the second data packet corresponds to the identification of the target wireless device comprises:
   instructions to check whether the second receiver ID included in the second data packet matches with an ID derived from the function of an association ID (AID) of the target wireless device, wherein the AID of the target wireless device is associated with the identification of the target wireless device; and
   instructions to determine that the second receiver ID in the second data packet corresponds to the identification of the target wireless device when the second receiver ID in the second data packet is identical to the ID derived from the function of the AID of the target wireless device.

20. The wireless network component of claim 12, wherein the second receiver ID is included in a physical (PHY) header of the second data packet.

* * * * *

UNITED STATES PATENT AND TRADEMARK OFFICE
CERTIFICATE OF CORRECTION

| | |
|---|---|
| PATENT NO. | : 10,091,688 B2 |
| APPLICATION NO. | : 14/073028 |
| DATED | : October 2, 2018 |
| INVENTOR(S) | : Kwon et al. |

It is certified that error appears in the above-identified patent and that said Letters Patent is hereby corrected as shown below:

On the Title Page

Item (71), in Column 1, in "Applicant", Line 1, delete "FutureWei" and insert -- Futurewei --, therefor.

On Page 2, Item (56), in Column 2, under "Other Publications", Line 15, delete "Tgah,"" and insert -- TGah," --, therefor.

In the Specification

In Column 1, Line 40, delete "an" and insert -- and --, therefor.

In Column 3, Line 58, delete "procedure;" and insert -- procedure; and --, therefor.

In Column 7, Line 25, delete "312" and insert -- 314 --, therefor.

In Column 7, Line 28, delete "312" and insert -- 314 --, therefor.

In Column 8, Line 4, delete "uplinkd" and insert -- uplink --, therefor.

In Column 10, Line 46, delete "601 allows" and insert -- 650 allows --, therefor.

In Column 10, Line 47, delete "networks" and insert -- network --, therefor.

Signed and Sealed this
Thirtieth Day of August, 2022

Katherine Kelly Vidal
*Director of the United States Patent and Trademark Office*